US005617516A

United States Patent [19]

Barton

[11] Patent Number: 5,617,516

[45] Date of Patent: Apr. 1, 1997

[54] METHOD AND APPARATUS FOR OPTIMIZING PRINTER OPERATION

[75] Inventor: Earl L. Barton, Corvallis, Oreg.

[73] Assignee: Hewlett-Packard Company, Palo Alto, Calif.

[21] Appl. No.: 537,168

[22] Filed: Sep. 29, 1995

Related U.S. Application Data

[63] Continuation of Ser. No. 200,793, Feb. 23, 1994, abandoned.

[51] Int. Cl.[6] .......... G01D 15/18

[52] U.S. Cl. .......... 395/113

[58] Field of Search .......... 395/113, 1.1, 110, 395/111, 114, 117; 346/1.1, 140, 75; 347/190, 194

[56] References Cited

U.S. PATENT DOCUMENTS

| | | | |
|---|---|---|---|
| 4,228,442 | 10/1980 | Krull | 347/28 |
| 4,591,870 | 5/1986 | Braun et al. | 347/25 |
| 4,791,435 | 12/1988 | Smith et al. | 347/17 |
| 4,910,528 | 3/1990 | Firi et al. | 347/17 |
| 4,920,362 | 4/1990 | Cowger | 347/87 |
| 4,968,998 | 11/1990 | Allen | 347/7 |
| 4,992,802 | 2/1991 | Dion et al. | 347/87 |
| 4,994,986 | 2/1991 | Cihiwsky | 395/113 |
| 4,998,116 | 3/1991 | Regnault | 347/6 |
| 5,113,199 | 5/1992 | Chan et al. | 347/87 |
| 5,121,130 | 6/1992 | Hempel et al. | 346/1.1 |
| 5,121,132 | 6/1992 | Pan et al. | 347/87 |
| 5,155,503 | 10/1992 | Tasaki et al. | 346/140 |
| 5,160,939 | 11/1992 | Bajeux et al. | 346/75 |
| 5,166,699 | 11/1992 | Yano et al. | 346/1.1 |
| 5,296,873 | 3/1994 | Russell et al. | 346/25 |

FOREIGN PATENT DOCUMENTS

| | | | |
|---|---|---|---|
| 0042055 | 4/1981 | European Pat. Off. | B41J 3/04 |
| 0317140 | 11/1988 | European Pat. Off. | B41J 3/02 |
| 55-86468 | 1/1982 | Japan | B41J 3/04 |
| 2-3324 | 1/1990 | Japan . | |
| 4-151256 | 5/1992 | Japan | B41J 2/175 |
| 4-344255 | 11/1992 | Japan | B41J 2/165 |
| 2169855 | 7/1986 | United Kingdom | B41J 3/04 |

*Primary Examiner*—Raymond J. Bayerl
*Assistant Examiner*—Steven P. Sax

[57] ABSTRACT

The present invention involves the use of onboard sensors which determine the printer's ambient environment for the purpose of selecting the printer's optimal operational subroutines. Conditions such as temperature and humidity are measured at the time of printer operation, the measurements being communicated to a processor wherein the printer's operational subroutines are set. The processor employs memory which is accessed via a table look-up arrangement using the measured temperature and humidity. The memory is divided into plural sectors, each of which stores a set of operational subroutines for use by the printer when it is situated in an environment characterized by predetermined temperature and humidity ranges.

2 Claims, 2 Drawing Sheets

METHOD AND APPARATUS FOR OPTIMIZING PRINTER OPERATION

CROSS REFERENCE TO RELATED APPLICATION

This is a continuation of application Ser. No. 08/200,793 filed on Feb. 23, 1994, now abandoned.

TECHNICAL FIELD

The present invention relates generally to printers, and, more particularly, to an arrangement whereby optimal printer operation may be achieved. Such optimization is achieved through recognition of the relationship between ambient environmental conditions and the printer's various operational tasks, and by adaptation of the printer to select operational subroutines based on the environmental conditions as they exist at the time the printer is used. Although useful in a variety of printer contexts, the invention is believed to be especially advantageous in the context of an ink-jet printer and is described in that context below.

BACKGROUND ART

In a conventional ink-jet printer, operational tasks are affected by the printer's ambient environment. This makes a determination of the printer's ambient environment an important step in selecting the printer's optimal operational subroutines. Conditions such as temperature and humidity, for example, will affect ink viscosity, and, correspondingly, will impact on the frequency with which printhead servicing should occur. This in turn will impact on the selection of the printer's optimal servicing subroutine, the operational subroutine which determines the frequency with which a printer's printheads are flushed and wiped. The ambient temperature and humidity will also affect factors such as ink drying time and record media absorption characteristics, both of which are important in selecting the printer's optimal printing subroutines. The printing subroutines, it will be appreciated, are operational subroutines which determine variables such as the rate of record media throughput and the economy of ink use.

Based on the foregoing, it should be apparent that the effectiveness of a printer's operational subroutines will change with the environment in which the printer operates, an environment which may be ambiguous at the time the printer's operational subroutines are set. Although known printers have been manufactured to operate under assumed environmental conditions, conditions generally have been assumed at the time of manufacture with little or no information concerning the actual environment in which the printer will be used. This has led to problems in the selection of effective operational subroutines where the printer's environment is not known at the time of manufacture, or where such environment is subject to change. These ambiguities have made it necessary to select operational subroutines which could be used under all environmental conditions in which the printer operates, an arrangement which may lead to the selection of less than optimal operational subroutines. A need has thus arisen for an arrangement whereby a printer's operational subroutines may be selected in view of actual environmental conditions, rather than those which have been assumed. Prior art printers have not met this need.

In the past, the aforementioned problems have been addressed simply by assuming a "worst case" environment when selecting operational subroutines. Servicing subroutines are thus chosen to direct frequent printhead servicing, it being assumed that the printer will operate in a cool/dry environment wherein the printhead nozzle is particularly susceptible to viscous plugs. Printing subroutines similarly are chosen to accommodate use of the printer in an undesirable environment, each subroutine being chosen assuming an environment which is least desirable for performing the corresponding printing task. The printing subroutine which directs the rate of record media throughput, for example, is chosen assuming a "worst case" ink drying time, it being assumed that the printer will operate in a cool/wet environment wherein ink is slow to dry. The printing subroutine which determines the printer's print mode (i.e., the number of printhead passes per line of characters) is chosen to compensate for poor record media absorption characteristics, characteristics common to a cool/dry environment wherein a greater number of printhead passes will be required to produce acceptable text.

Although effective in avoiding printer failure, the aforementioned assumptions may result in the use of less than optimal operational subroutines, particularly where the printer operates under environmental conditions which are different from the "worst case" conditions assumed. This can lead to unnecessary printhead servicing, slower than necessary record media throughput, and a waste of materials such as servicing solvents and ink. These factors in turn may result in increased component wear, increased printer down time, and increased operating cost.

DISCLOSURE OF THE INVENTION

The present invention involves the use of onboard sensors which determine the printer's actual ambient environment for the purpose of selecting the printer's optimal operational subroutines. In accordance with the invention, conditions such as temperature and humidity are measured at the time of printer operation, the measurements being communicated to a processor with a memory wherein the printer's operational subroutines are stored for table look-up. The memory is accessed using the measured temperature and humidity values, the memory being divided into plural sectors, each of which includes a set of operational subroutines which have been determined to be optimal for use by the printer when it operates within an environment having predetermined temperature and humidity ranges. In the preferred embodiment, the printer's servicing and printing subroutines are selected in this manner, the optimization of such subroutines thus being linked to the ambient temperature and humidity at the time printing occurs.

These and additional objects and advantages of the present invention will be more readily understood after a consideration of the drawings and the detailed description of the preferred embodiment which follows.

DETAILED DESCRIPTION OF THE PREFERRED EMBODIMENT AND BEST MODE OF CARRYING OUT THE INVENTION

In accordance with the present invention, method and apparatus have been developed whereby a printer is adapted to determine ambient environmental conditions at the time of printing, and to use such information to select the printer's optimal operational subroutines. The invention is suitable for use in virtually any style printer, but is believed to be particularly useful in an ink-jet printer and is described as such below.

Figure 1:
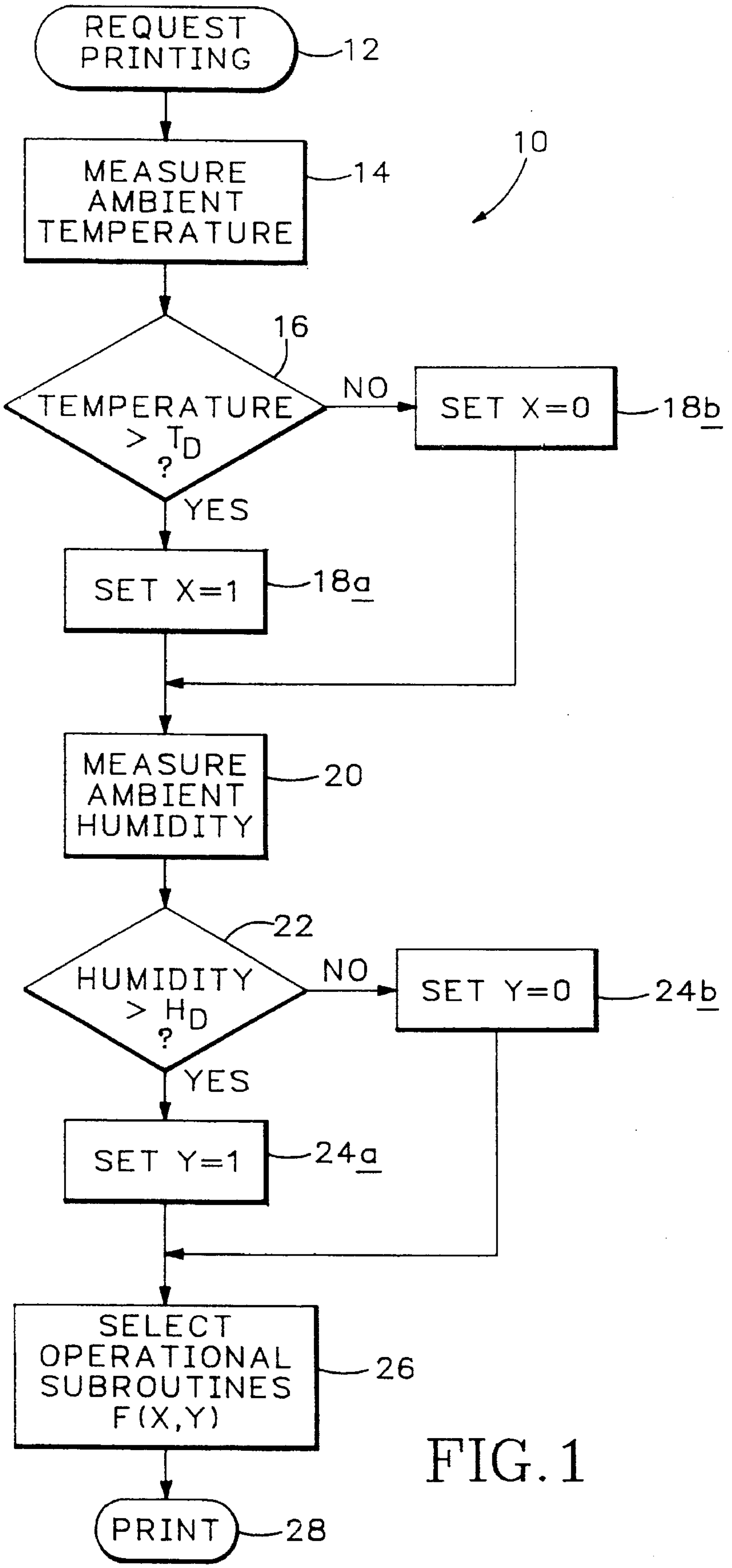
FIG. 1 is a flowchart which schematically illustrates a preferred method of optimizing printer operation.

Referring initially to FIG. 1, a flowchart has been provided to illustrate the preferred method of the invention, the flowchart being indicated generally at 10. As shown, the invented method begins when the printer receives a "REQUEST PRINTING" command (12), the command being sent by a conventional printer controller such as a personal computer or file server (not shown). Upon receiving such command, a first ambient environmental condition is measured (14), the measured condition being useful in selecting the printer's optimal operational subroutines as will be described.

In the preferred method, the first ambient environmental condition is temperature, and the operational subroutines are the printer's servicing and printing subroutines. Those skilled in the art will appreciate that both servicing and printing subroutines are conventional in printer technologies, but that the selection of optimal subroutines based on ambient environmental conditions is new. Servicing subroutines generally are employed to effect periodic flushing, wiping and capping of a printer's printhead. Printing subroutines are employed to direct printing, such subroutines being determinative of record media throughput, printhead carriage movement, and operation of the printer's printhead. Printing subroutines also determine the printer's print mode (i.e., the number printhead passes per line of characters).

The measured temperature is compared to a predetermined temperature value $T_D$ (16), the value $T_D$ being representative of a threshold temperature which divides the range of acceptable operating temperatures into a high temperature range and a low temperature range. If the measured temperature is greater than $T_D$, the printer is considered to be operating in a hot environment (within the high temperature range), and if the measured temperature is less than or equal to $T_D$, the printer is considered to be operating in a cool environment (within the low temperature range). According to the preferred method, $T_D$ is set at approximately room temperature (23° C.), but $T_D$ could similarly be set at any other temperature within the printer's acceptable operating temperature range.

A variable X is set in accordance with the measured temperature, the value of X being determined by the relationship between the measured temperature and the predetermined temperature $T_D$. If the measured temperature is within the high temperature range, X is set to 1 (18*a*), and if the measured temperature is within the low temperature range, X is set to 0 (18*b*). Those skilled in the art will recognize that the range of acceptable operating temperatures may similarly be divided into three or more temperature ranges, each temperature range being assigned a particular X value so as to identify that range.

In addition to the aforementioned temperature measurement, the method illustrated by flowchart 10 also includes a measurement of a second ambient environmental condition humidity (20), the invention directing a measurement of the ambient humidity for use in connection with the measured temperature to provide a more complete picture of the environment in which printing will occur. Like the ambient temperature, the ambient humidity has been determined to affect the optimization of the printer's servicing and printing subroutines.

The measured humidity is compared with a predetermined threshold humidity value $H_D$ (22), the value $H_D$ representing the humidity which divides the range of acceptable operating humidity into a high humidity range and a low humidity range. Where the measured humidity is greater than $H_D$, the printer is considered to be operating in a wet environment (within the high humidity range). Otherwise, the printer is considered to be operating in a dry environment (within the low humidity range). In the preferred embodiment, $H_D$ is set at 50% humidity, a value which corresponds to the middle of the printer's acceptable humidity range.

A variable Y is set in accordance with the measured humidity, the value of Y being determined by the relationship between the measured humidity and the predetermined humidity $H_D$. If the measured humidity is within the high humidity range, Y is set to 1 (24*a*), and if the measured humidity is less than or equal to $H_D$, Y is set to 0 (24*b*). As indicated with respect to the range of acceptable operating temperatures, the range of acceptable operating humidities may be divided into any number of humidity ranges, each humidity range being assigned a particular Y value so as to provide for identification of that range.

It is to be understood that, although the illustrated method indicates a sequence of first measuring ambient temperature, and then measuring ambient humidity, the order of determining ambient temperature and ambient humidity may be reversed. Similarly, although ambient temperature and ambient humidity are the environmental conditions measured in the preferred method, other environmental conditions similarly may be measured, the pertinent environmental conditions being dependent upon the particular operational subroutines which are to be selected.

Once the humidity and temperature are determined, and the X and Y variables are correspondingly set, the printer's optimal operational subroutines are selected (26). These subroutines are accessed via a function, F(X, Y) which is based on the assigned temperature variable X and the assigned humidity value Y. This function points to a memory address within the printer's onboard microprocessor so as to identify a set of operational subroutines which have been determined to be optimal for use by a printer operating within the identified temperature and humidity ranges. In the preferred method, the printer's servicing and printing subroutines have been chosen for optimization, the optimization of such subroutines being known to relate to the temperature and humidity in which the printer operates. The particulars of these subroutines are determined by experimentation, and are dependent upon the design of the printer in which the subroutines are to be used. The nature of the memory organization is illustrated by the simplified mapping diagram of FIG. 3, a more complete description being provided below.

After the operational subroutines are selected, the printer may begin printing (28), the printer employing the selected operational subroutines. In the preferred method, the selected operational subroutines will include both servicing and printing subroutines, with the effectiveness of such subroutines being related to the ambient temperature and ambient humidity as suggested above. The selected subroutines are employed until the next "REQUEST PRINTING" command is sent, at which time the temperature and humidity are again measured, and new operational subroutines are selected with the newly measured environmental conditions in mind.

Figure 2:
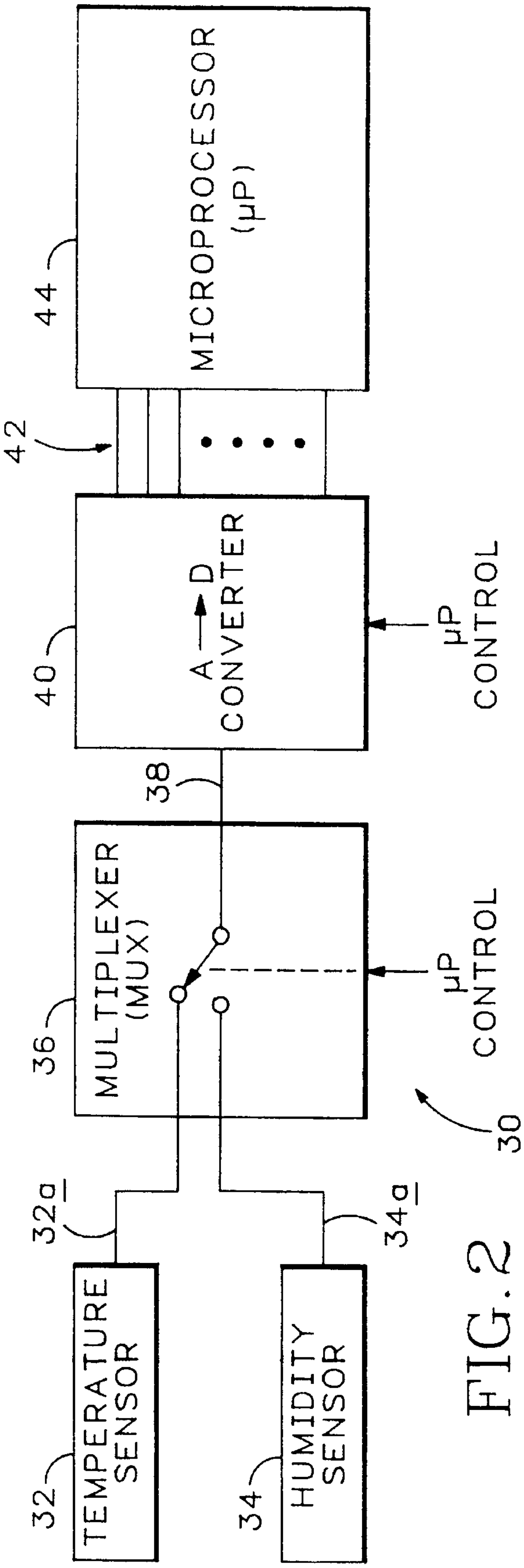
FIG. 2 is a simplified, schematic block diagram of the apparatus of the invention, made in accordance with its preferred embodiment.

FIG. 2 depicts a highly-schematic representation of the invented apparatus 30, such apparatus including a pair of onboard environmental sensors 32, 34. First environmental sensor 32 is in the form of a conventional temperature sensor, such sensor being capable of measuring the printer's ambient temperature to accomplish the method step indicated at 14 in FIG. 1. Second environmental sensor 34 is in the form of a conventional humidity sensor which is capable of measuring the printer's ambient humidity to accomplish the method step indicated at 20 in FIG. 1. The sensors provide analog outputs 32*a*, 34*a*, which are fed to conventional multiplexer (MUX) 36.

In the preferred embodiment, the multiplexer selects from the temperature and humidity analog outputs, such selection being achieved under microprocessor control. The selected output is passed along a conductor 38 to an analog-to-digital converter (ADC) 40 which is also under microprocessor control. It will be appreciated that multiplexer 36 may be directed by the microprocessor 44 to alternate between the depicted temperature-sensing position and a humidity-sensing position (not shown) of the logical switch, or MUX 40, so that a single analog-to-digital converter may be used. Alternatively, the multiplexer could be eliminated and two ADCs could be used.

A multichannel digital data bus 42 connects the analog-to-digital converter to a processor such as microprocessor 44. The data bus, it will be appreciated, includes X and Y outputs of ADC 40 which are connected to the microprocessor for accessing the optimal operational subroutines via function F(X, Y). As is conventional, the microprocessor employs a memory (internal or external) which contains the printer's operational subroutines.

Figure 3:
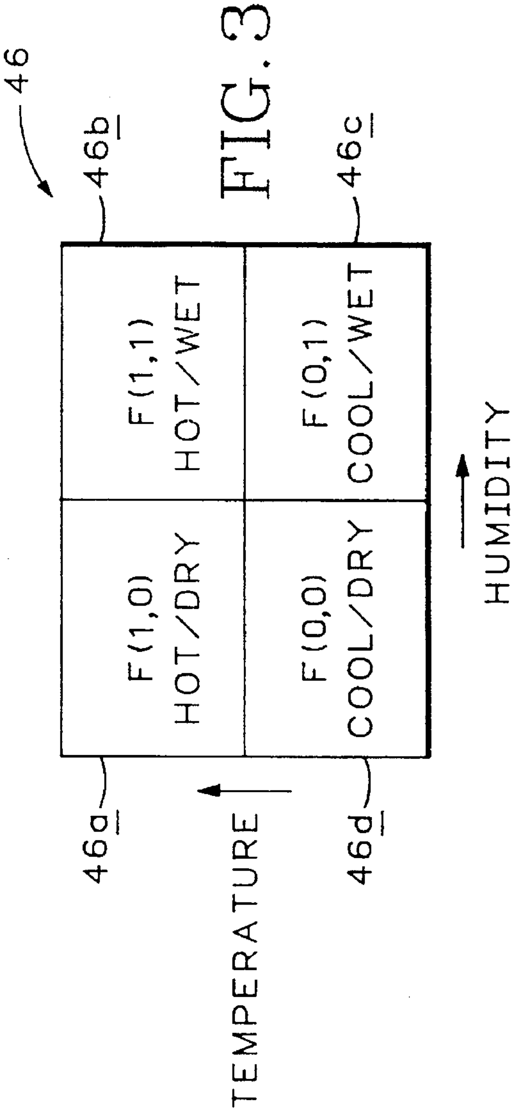
FIG. 3 illustrates a memory arrangement which is utilized in the present invention to effect selection of a printer's operational subroutines.

As indicated in FIG. 3, the memory of microprocessor 44 may be considered to include a look-up table 46, the look-up table being divided into four sectors 46*a*, 46*b*, 46*c*, 46*d*. Those skilled will appreciate that the memory may similarly be arranged to identify additional sectors, the number of sectors being limited only by the size of the microprocessor's memory and the ability of the environmental sensors to distinguish environmental ranges. In the preferred embodiment, each sector is identified by particular X and Y values which are used in function F(X, Y) as described above. Function F(X, Y), it will be recalled, points to the memory address of a predetermined set of operational subroutines. Each sector includes a set of operational subroutines which are optimal for the temperature and humidity ranges as defined by X and Y. The operational subroutines are thus chosen in accordance with the environmental conditions as they exist at the time printing occurs.

INDUSTRIAL APPLICABILITY

It may be seen that the invented method and apparatus optimize the printer's operation by accommodating environment-directed selection of the printer's operational subroutines. Subroutines are chosen based on actual environmental conditions at the time of printing, rather than being based on conditions assumed at the time of manufacture of the printer. The result is a potential for increased printer throughput, decreased material waste, and decreased component wear. The degree of optimization is dependent upon the particular limitations of the microprocessor, and on the ability of the sensors to discern conditions within the predetermined acceptable operating ranges. The present method and apparatus are thus useful in virtually any printer for effecting optimization of the printer's operational subroutines.

While the present invention has been shown and described with reference to the foregoing operational principals and preferred method and apparatus, it will be apparent to those skilled in the art that other changes in form and detail may be made therein without departing from the spirit and scope of the invention as defined by the claims.

I claim:

1. A method of optimizing an addressable printer operation, the printer being directed by a personal computer or file server, the method comprising the steps of:

upon receiving a request to commence a printing event, measuring a first value of temperature ambient to the printer;

determining whether said first value of ambient temperature is greater than or less than a predetermined second value of temperature;

setting a first variable to a first state when said first value of ambient temperature is greater than said predetermined second value of temperature and setting said first variable to a second state when said first value of ambient temperature is less than said predetermined second value of temperature;

measuring a first value of humidity ambient to the printer;

determining whether said first value of humidity is greater than or less than a predetermined second value of humidity;

setting a second variable to a third state when said first value of ambient humidity is greater than said predetermined second value of humidity and setting said second variable to a fourth state when said first value of ambient humidity is less than said predetermined second value of humidity;

selecting a printer operational subroutine in accordance with said states set said first and second variable; and commencing printing with the printer and employing said selected printer operational subroutine for the duration of said printing event.

2. A method of optimizing an addressable printer operation, the printer being directed by a personal computer or file server, the method comprising the steps of:

upon receiving a request to commence a printing event, measuring a first value of temperature ambient to the printer;

determining whether said first value of ambient temperature is greater than or less than a predetermined second value of temperature;

setting a first variable to a first state when said first value of ambient temperature is greater than said predetermined second value of temperature and setting said first variable to a second state when said first value of ambient temperature is less than said predetermined second value of temperature;

measuring a first value of humidity ambient to the printer;

determining whether said first value of humidity is greater than or less than a predetermined second value of humidity;

setting a second variable to a third state when said first value of ambient humidity is greater than said predetermined second value of humidity and setting said second variable to a fourth state when said first value of ambient humidity is less than said predetermined second value of humidity;

selecting a printer operational subroutine which is stored as a function of said first and second variable, in accordance with said states set for said first and second variable;

commencing printing with the printer and employing said selected printer operational subroutine for the duration of said printing event; and remeasuring said first value and said second value for each subsequent printing event.

* * * * *